Sept. 30, 1952      E. B. THOMPSON      2,612,344
ADJUSTABLE LOAD ENGAGER FOR VEHICLE LIFTS
Filed Dec. 7, 1949      2 SHEETS—SHEET 1

INVENTOR.
Elmer B. Thompson

Sept. 30, 1952    E. B. THOMPSON    2,612,344
ADJUSTABLE LOAD ENGAGER FOR VEHICLE LIFTS
Filed Dec. 7, 1949    2 SHEETS—SHEET 2
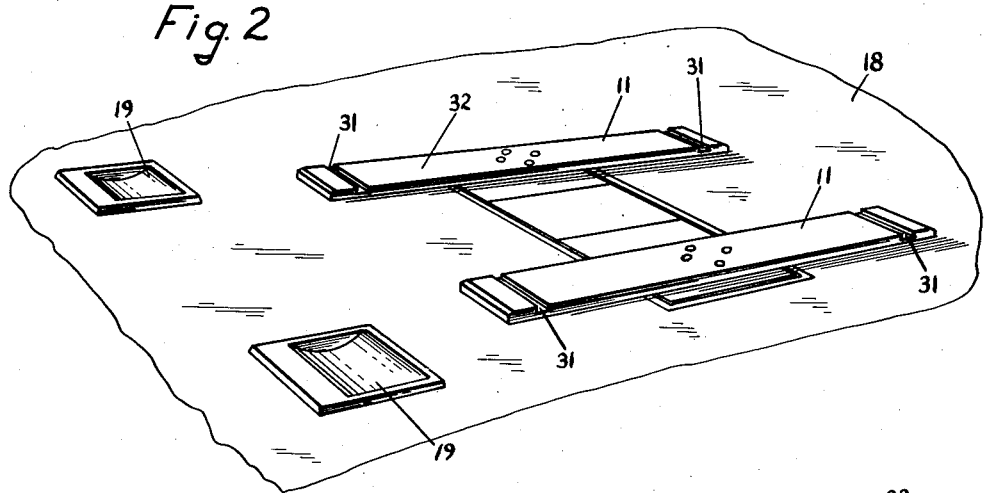
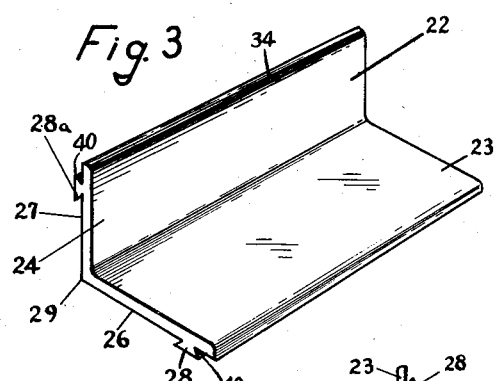
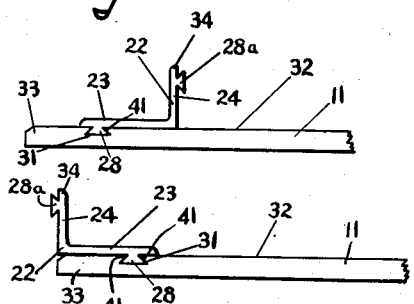
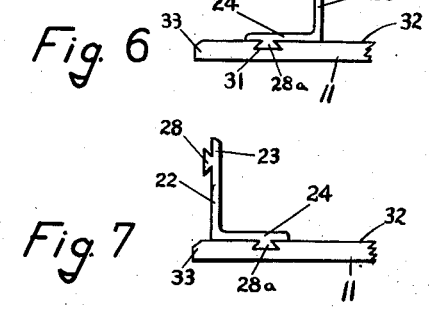
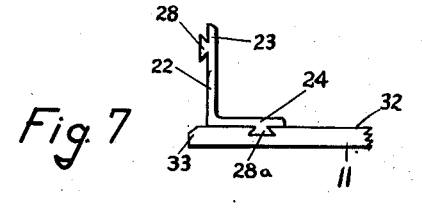
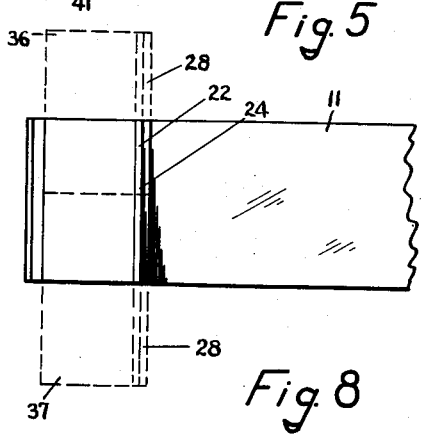
INVENTOR.
Elmer B. Thompson
BY Rudolph L. Lavell
att'y Patented Sept. 30, 1952

2,612,344

UNITED STATES PATENT OFFICE 2,612,344

ADJUSTABLE LOAD ENGAGER FOR VEHICLE LIFTS

Elmer B. Thompson, Des Moines, Iowa, assignor to Globe Hoist Company, Des Moines, Iowa, a corporation of Iowa Application December 7, 1949, Serial No. 131,598

5 Claims. (Cl. 254—89)

This invention relates generally to vehicle hoists and in particular to a vehicle hoist having transversely spaced lift members provided with longitudinally extended vehicle frame supporting members for supporting a vehicle between the front and rear wheels thereof.

Automobile main frames are generally of a rectangular shape having side frame members upwardly curved at their rear ends to accommodate the rear axle and front end portions converged in a forward direction to accommodate the front steering wheels. However, in different model automobiles, and in different years for the same model automobile, there is an appreciable variation in the width of the main frame and the angle of convergence of the front end portions of the frame side members. As a result, considerable difficulty has been encountered in adapting a vehicle hoist of frame supporting type to generally accommodate all makes and years of automobiles. This difficulty is further increased by the fact that many automobiles and trucks have under parts, such as generators, compressors, exhaust pipes and the like, that are closely adjacent to the frame side members and which must be cleared by the frame engaging members of the hoist in a vehicle lifting operation.

It is an object of this invention, therefore, to provide an improved vehicle hoist or lift.

A further object of this invention is to provide a hoist of vehicle frame supporting type in which vehicle frame engaging members are provided with frame contact members adjustably movable both transversely and longitudinally of the hoist to selected frame contacting positions.

Still another object of this invention is to provide a hoist of vehicle frame supporting type having frame supporting members positioned between the front and rear wheels of a vehicle, in which the opposite ends of the supporting members are equipped with like vehicle frame engaging members of a construction, and adjustably supported on the frame supporting members, to engage the side members of frames of substantially all model vehicles.

A feature of this invention is found in the provision of a hoist of a vehicle frame supporting type in which a pair of transversely spaced lift members are provided with longitudinally extended flat horizontal frame supporting members positioned between the front and rear wheels of a vehicle. Vehicle frame engaging members of a right-angle shape have elongated keepers or guides on the outside of each leg thereof for interchangeable slidable reception within transverse grooves at the ends of the frame supporting members. With a guide received in a groove, therefore, one leg of a frame engaging member rests on the top side of a frame supporting member while its other leg projects upwardly to contact the vehicle frame. The guides of each frame engaging member are spaced unequal distances from the junction of the legs therefor so that by interchanging such guides in a groove the upright leg is movable to longitudinally spaced positions on the flat supporting members, whereby the vehicle frame contacting leg is movable longitudinally and transversely of the flat supporting members to vehicle frame contacting positions. Co-acting portions on the guides and on the side walls of the grooves hold the frame engaging members against lateral tipping movement relative to the flat supporting members.

Further objects, features and advantages of this invention will become apparent from the following description when taken in connection with the accompanying drawings, in which:

Fig. 2 is a perspective view of the hoist in Fig. 1 shown in a lowered position and with the frame engaging members removed;

Fig. 3 is an enlarged perspective view of a frame engaging member;

Figs. 4, 5, 6 and 7 are fragmentary elevational views showing the frame engaging members in relatively changed positions therefor on the hoist; and Fig. 8 is a fragmentary plan view showing the assembly of a frame engaging member with frame supporting member.

Figure 1:
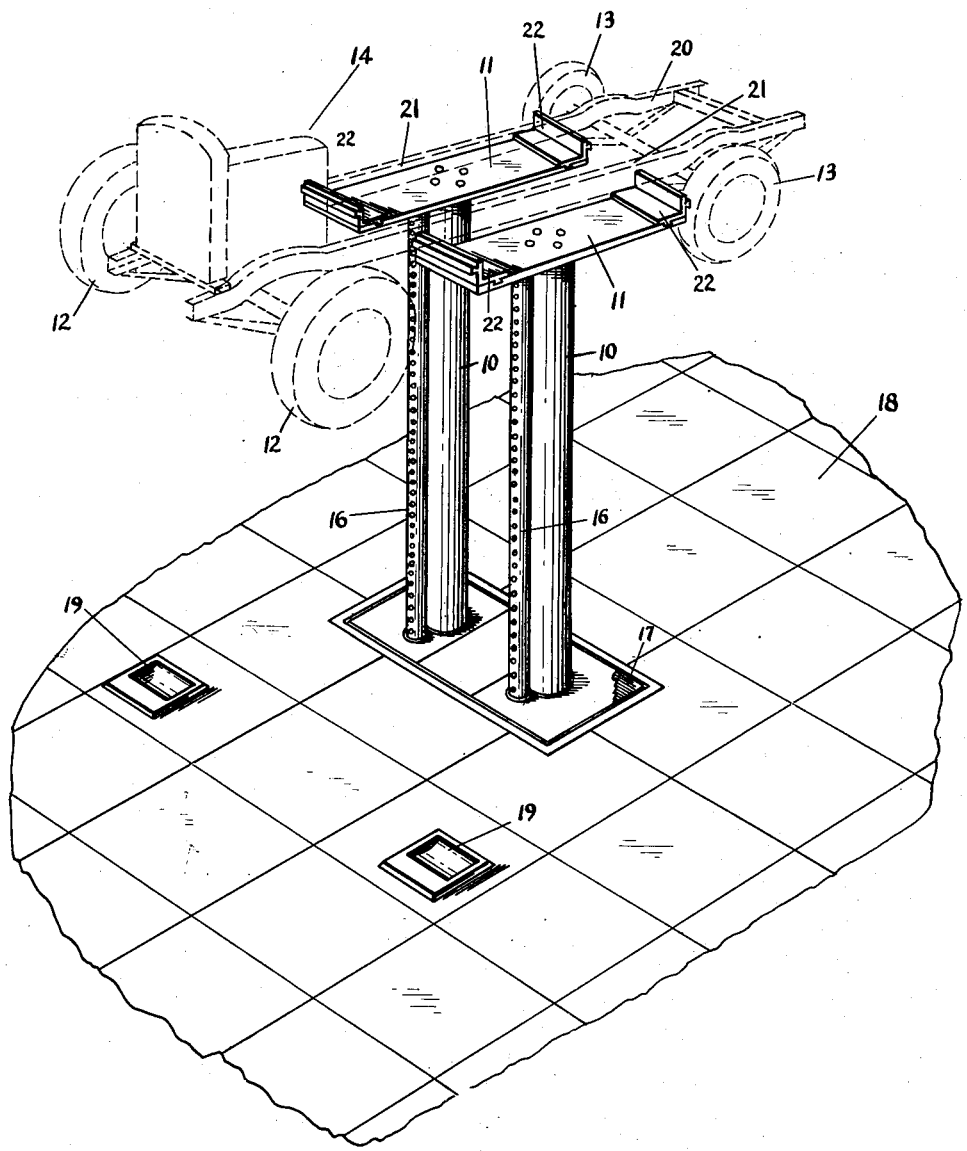
Fig. 1 is a perspective view of a hoist embodying the frame engaging members of this invention and showing a vehicle in an elevated position therein.

With reference to the drawings there is illustrated in Fig. 1 a pit-mounted vehicle hoist of vehicle frame engaging type which includes a pair of transversely spaced lift pistons or members 10 having secured to their upper ends longitudinally extended horizontal vehicle frame supporting members 11 of a flat plate construction and of a length to be positioned between the front wheels 12 and rear wheels 13 of a vehicle indicated at 14. The lift members 10 are raised and lowered in a well-known manner by a hydraulic control system (not shown) and are synchronized for up and down movement together by means including rack members 16 extended longitudinally of the lift members 10 and suitably secured to the plate members 11 for up and down movement with the lift members 10. A gear and shaft assembly (not shown), located within the floor pit 17, is operatively associated with the rack members 16.

When the hoist is in a lowered position, as shown in Fig. 2, the vehicle frame supporting or plate members 11 rest directly on the floor surface 18 so as to substantially eliminate any obstruction to a normal use of the floor space occupied by the hoist. In the elevating of a vehicle, the vehicle 14 is driven over the plate members 11 such that either its front wheels 12 or rear wheels 13 are received within wheel depressions 19 on the floor surface 18 whereby to locate the plate members 11 between the front and rear wheels of the vehicle.

To provide for an engagement of the side frame members 21 of the vehicle frame or chassis 20 by the hoist, without interfering with any of the under parts of the vehicle 14, the plate members 11 are provided at each end thereof with frame engaging members 22. Since the frame engaging members 22 are of a like construction and similarly assembled with the plate members 11, only one thereof will be referred to in detail in the following description.

A frame engaging member 22 (Fig. 3) is of an angle construction and of a substantially L-shape in transverse cross-section so as to have a long leg 23 and a short leg 24. Suitably secured, as by welding or like means, to the outer sides 26 and 27 of the legs 23 and 24, respectively, are longitudinally extended guide ribs or keepers 28 and 28a, also respectively, of a substantially dove-tail shape in transverse cross-section. The guides 28 and 28a are spaced unequal distances from the junction 29 of the legs 23 and 24 and adjacent the free ends of their respective legs.

In the use of a frame engaging member 22, the guides 28 and 28a are interchangeably received within transverse grooves 31, formed at opposite ends of the plate members 11 (Fig. 2). The grooves 31 are of a size and shape corresponding to the guides 28 and 28a so as to slidably receive such guides therein.

As shown in Fig. 4 for one application of the frame engaging member 22, the guide 28 is inserted within a groove 31 so that the long leg 23 rests directly on the top surface 32 of the plate member 11, and the short leg 24 extends upwardly from the plate member 11 at a position spaced inwardly from its end 33 so that the free end 34 of the short leg 24 is in a position to contact a side member 21 of the vehicle chassis 20.

By reversing the frame engaging member 22 from its position shown in Fig. 4 to its position shown in Fig. 5, and with the guide 28 again inserted within the groove 31, the short leg 24 is moved to a position adjacent to the end 33 of the plate member 11. By merely reversing the frame engaging member 22, therefore, the frame contacting leg 24 is movable to adjusted positions spaced longitudinally of the plate member 11.

As shown in Fig. 8, the slidable engagement of the guide 28 within the groove 31 provides for adjustable movement of the frame engaging member 22 transversely of the plate 11 to positions such that the opposite ends 36 and 37 of the member 22 are capable of being moved to positions spaced laterally outwardly from opposite sides of the plate 11. As a result, it is seen that the frame contacting leg 24 is capable of adjustable movement both longitudinally and transversely of the plate 11 to a desired adjusted position depending upon the vehicle lifting conditions encountered.

In a like manner, and as shown in Fig. 6, when the guide 28a is inserted within a groove 31, the short leg 24 rests in a supported position on the top side 32 of the plate 11 and the long leg 23 is projected upwardly from the plate 11 so as to constitute a frame contacting portion. The long leg 23 is shown in Fig. 6 as being spaced inwardly from the end 33 of the plate member 11. By merely reversing the frame engaging member 22, from its position in Fig. 6 to its position in Fig. 7, the long leg 23 is adjacent to the end 33 of the plate member 11.

In one embodiment of the invention, the plate member 11 has a width of about ten inches and the frame engaging members 22 are of a length of about ten inches. In this embodiment, the short leg 24 is about four inches long and the long leg 23 is about six inches long. As a result, the frame engaging members 22 are capable of transverse adjustment to positions with their ends 36 and 37 located at least five inches outwardly from opposite sides of the plate 11 while assuring complete stability of the frame engaging members for lifting purposes.

Further, by the arrangement of the guides 28 and 28a at unequal distances from the junction 29 of the legs 23 and 24, and adjacent to the free ends of their respective legs 23 and 24, the longitudinal spacing of the frame contacting leg, as appears from a consideration of Figs. 4-7, inclusive, is appreciably increased. By virtue of the dovetail shape of the guides 28 and 28a, and the grooves 31, the frame engaging members 22 are positively held within the grooves 31 against tipping movement laterally of the plate members 11 for any adjusted position of the members 22. In other words, the co-acting engagement between the side portions 40 of the guides 28 and 28a with the side walls 41 of the grooves 31 prevents any movement of the guides out of the grooves while providing for a free adjustment of the members 22 transversely of the plates 11. Also, the unequal length of the legs 23 and 24 provides for a desired clearance relation with low clearance frames or any of the vehicle parts underhung from the frame.

From a consideration of the above description it is seen that the invention provides frame engaging members 22 of a simple construction and readily applicable to contact automobile frames of varying sizes and shapes in a clearance relation with the underparts of the automobile. By interchanging the guides 28 and 28a relative to the grooves 31, the frame contacting portions of the frame engaging members 22 are moved to positions spaced longitudinally of the plate members 11. Since the plate members 11 are located between the front and rear wheels of a vehicle 14, complete access and maneuverability of the members 22 to desired frame contacting positions is readily had from the side of the automobile prior to any engagement of the vehicle frame members 21 by the members 22.

Although the invention has been described with respect to a preferred embodiment thereof, it is to be understood that it is not to be so limited since changs and modifications can be made therein which are within the full intended scope of this invention, as defined by the appended claims.

I claim:

1. For use with a vehicle hoist wherein a lift member carries a flat horizontal longitudinally extended plate member at its upper end for supporting the frame of a vehicle to be elevated, a vehicle frame engaging member of a substantially L-shape in transverse cross section, transversely extended guide portions at opposite ends of said plate member, an elongated guide portion on the outer side of each leg of said frame engaging member extended longitudinally of the frame engaging member and guidably engageable with a transverse guide portion on said plate member such that said frame engaging member is adjustably movable transversely of said plate member, and co-acting portions on said guide portions for holding said frame engaging member against tipping movement laterally of said plate member at any moved position of said frame engaging member.

2. For use with a vehicle hoist wherein a lift member carries a flat horizontal longitudinally extended plate member at its upper end for supporting the frame of a vehicle to be elevated, a vehicle frame engaging member adjustably movable transversely of said plate member and of a right angle shape in transverse cross section, transverse guide ways at the opposite ends of said plate member, a longitudinally extended guide on the outer side of each leg of said frame engaging member spaced unequal distances from the junction of the legs, with the guide on said frame engaging member being interchangeably received within a guide way on said plate member so that the frame engaging member has one leg thereof in a horizontal plane and the other leg thereof extended upwardly to contact the vehicle frame, and means for holding said one leg in a horizontal plane at any moved position of said frame engaging member transversely of said plate member.

3. For use with a vehicle hoist wherein a lift member carries a flat horizontal longitudinally extended plate member at its upper end for supporting the frame of a vehicle to be elevated, a vehicle frame engaging member of a substantially L-shape in transverse cross section, a longitudinally extended guide on the outer side of each leg of said frame engaging member of a substantially dove tail shape in transverse cross section, with said plate member having transverse grooves at the opposite ends thereof of a shape and size corresponding to said guides so as to slidably receive said guides therein, said guides being spaced unequal distances from the junction of the legs of said frame engaging member and being interchangeably received within a groove so that one leg of the frame engaging member rests on the top surface of the plate member and the other leg thereof projects upwardly from said plate member to engage a vehicle frame, with the side portions of said guides and grooves co-acting to lock said frame engaging member against tipping movement laterally of said plate member.

4. For use with a vehicle hoist wherein a lift member carries a flat horizontal longitudinally extended plate member at its upper end for supporting the frame of a vehicle to be elevated, a vehicle frame engaging member of a substantially L-shape in transverse cross section adjustably movable transversely of said plate member, a longitudinally extended guide member on the outer side of each leg of said frame engaging member, with said plate member having transverse grooves at the opposite ends thereof for slidably receiving a guide member on said frame engaging member, said frame engaging member being of a length substantially equal to the width of said plate member and the guide members on said frame engaging member being spaced unequal distances from the junction of the legs thereof, with a guide member being interchangeably positioned within a groove so that one leg of said frame engaging member rests on said plate member and the other leg thereof projects upwardly from the plate member to contact the vehicle frame, and co-acting portions on the side walls of said grooves and on said guides to hold said frame engaging member against lateral tipping movement relative to said plate member.

5. For use with a vehicle hoist wherein a lift member carries a flat horizontal longitudinally extended plate member at its upper end for supporting the frame of a vehicle to be elevated, a frame engaging member adjustably carried on said plate member for linear movement transversely thereof including a frame contact portion movable to opposite sides of the transverse path of movement of said frame engaging member and to positions outwardly from opposite sides of said plate member, and co-acting portions on said frame engaging member and on said plate member for holding said frame engaging member against lateral tipping movement relative to said plate member at any moved position of said frame engaging member.

ELMER B. THOMPSON.

REFERENCES CITED

The following references are of record in the file of this patent:

UNITED STATES PATENTS

| Number | Name | Date |
| --- | --- | --- |
| 1,478,307 | Sykes et al. | Dec. 28, 1923 |
| 1,975,729 | Muhollen | Feb. 20, 1934 |
| 2,423,954 | Thompson | July 15, 1947 |